US 6,548,037 B1

(12) United States Patent
Pozzoli

(10) Patent No.: US 6,548,037 B1
(45) Date of Patent: Apr. 15, 2003

(54) ALUMINIUM POLYCHLOROSULPHATES, PROCESS FOR THEIR PREPARATION AND USE THEREOF

(76) Inventor: Bernardo Pozzoli, Rua Constante Ramos 93/503 22051-010 Copacabana, Rio De Janeiro (BR)

( * ) Notice: Subject to any disclaimer, the term of this patent is extended or adjusted under 35 U.S.C. 154(b) by 28 days.

(21) Appl. No.: 09/679,573

(22) Filed: Oct. 5, 2000

(51) Int. Cl.$^7$ .............................. C01F 7/74; C01F 7/00
(52) U.S. Cl. .................... 423/512.1; 423/518; 423/551; 423/556; 423/592; 423/593; 423/625; 423/626; 423/641; 423/642
(58) Field of Search .................... 210/705; 252/60, 252/175; 423/512.1, 518, 592, 593, 625, 626, 641, 642, 551, 556, 600

(56) References Cited

U.S. PATENT DOCUMENTS

| | | | | |
|---|---|---|---|---|
| 4,563,342 A | * | 1/1986 | Gunnarsson et al. ........ | 423/556 |
| 4,582,627 A | * | 4/1986 | Carlsson .................... | 252/181 |
| 5,518,706 A | * | 5/1996 | Boutin et al. .............. | 423/467 |

FOREIGN PATENT DOCUMENTS

| | | |
|---|---|---|
| EP | 0557153 A1 | 8/1993 |
| EP | 0744378 A1 | 11/1996 |
| EP | 0794153 A1 | 9/1997 |

OTHER PUBLICATIONS

European Search Report, The Hague, Jun. 29, 2000, Examiner W. Zalm.
Abstract of DE 2630768A Jan. 13, 1977.
Abstract of JP 53001699A Jan. 9, 1978.
Abstract of EP 327419A Aug. 9, 1989.
Abstract of JP 52–113,384 A Sep. 22, 1977.

\* cited by examiner

Primary Examiner—Steven Bos
Assistant Examiner—Timothy C Vanoy
(74) Attorney, Agent, or Firm—Hedman & Costigan, P.C.

(57) ABSTRACT

Aluminum polychlorosulphates having the general formula (I)

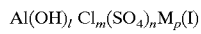

$$Al(OH)_l\,Cl_m(SO_4)_n M_p \quad (I)$$

where

M represents an alkali metal l, m, n, p represent the number of moles per mole of aluminum, so that $1.74 \leq l \leq 2.25$, $0.01 \leq n \leq 0.17$, $0.32 \leq p \leq 1.49$, and $l+m+2n=p+3$, their use as coagulation and flocculation agents, and their preparation process by reaction, at room temperature, of an alkali metal basic compound, such as $Na_2CO_3$, $NaHCO_3$, NaOH, $K_2CO_3$, $KHCO_3$ and KOH, and an alkali metal sulphate or sulphuric acid with an aluminum polychloride or polychlorosulphate having the general formula (I')

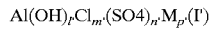

$$Al(OH)_{l'}Cl_{m'}(SO4)_{n'} M_{p'} \quad (I')$$

where $1.1 \leq l' \leq 1.44$, $n' \leq 0.10$, $p' < p$ (p of formula (I)), and $l'+m'+2n'=p'+3$.

9 Claims, No Drawings

ALUMINIUM POLYCHLOROSULPHATES, PROCESS FOR THEIR PREPARATION AND USE THEREOF

FIELD OF THE INVENTION

The present invention relates to new aluminium polychlorosulphates having high basicity and stability, low sulphate content, and high coagulating and flocculating power, and to an improved production process thereof, easy to perform, carried out at room temperature, and free from any contamination and residue.

STATE OF THE ART

Aluminium polychlorosulphates are used in drinking and waste water treatment, in paper industry and in many industrial clarification processes. The performance and the applications of these aluminium polychlorosulphates depend not only on their chemical characteristics, but in particular on the process used for their manufacture. In most different fields of application it has been observed that aluminium polychlorosulphates with a very similar empirical formula can present completely different performances, depending on the method used for their preparation. The reason of this behaviour is attributed to the presence in solution of ionic polycondensed species, whose constitution and structure depend on the manufacturing process.

To the several applications of aluminium polychlorides and polychlorosulphates belong the manufacture of antiperspirant compositions, the production of catalyst supports, the sizing treatment of paper in paper industry and the treatment of water and waste water.

In water and waste water treatment the aluminium polychlorides and polychlorosulphates have been gaining strength to the detriment of other traditionally used compounds, like iron salts and aluminium sulphate, owing to the greater coagulating and flocculating power of these basic aluminium salts. The coagulating and flocculating properties can be improved by addition of sulphate ions ($SO_4^{2-}$), whose synergy is well known since a long time.

Unlike aluminium sulphate solutions which are very stable, aluminium polychlorosulphate solutions are stable only in certain conditions of concentration, basicity and sulphate content.

The aluminium polychlorosulphates suitable for water treatment, especially for the treatment of drinking water, must exhibit a sufficiently high basicity and a sufficiently low sulphate content to guarantee a low level of residual aluminium in the treated water. On the other hand, the level of sulphate must be sufficiently high to guarantee good coagulating/flocculating properties. Too high basicities impair the coagulating/flocculating power. Low basification temperatures promote a good coagulation/flocculation. High basicities associated with high levels of sulphate impair the stability of aluminium polychlorosulphates.

In order to obtain aluminium polychlorosulphates suitable for water treatment, especially for drinking water treatment, a balance must be found between a sufficiently high level of sulphate to favour good coagulating/flocculating properties, without increasing the soluble aluminium content in treated water, and a sufficiently high basicity to guarantee low levels of residual aluminium, without impairing the coagulating/flocculating properties. Further the product must be stable, the preparation process must be simple and must not release any type of pollutant.

Aluminium polychlorosulphates that satisfy some of the above-mentioned requirements are known:

a) The French Patent Application No. FR-A-2317227 describes the process, carried out at a temperature lower than 50° C., for the preparation of aluminium hydroxychloride having the general formula:

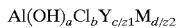

where:

Y represents an anion with valency Z1, typically $SO_4^{2-}$

M represents a cation with valency Z2, such as ammonium, an alkali metal or an alkaline-earth metal and 1.2<a<1.7, 0<c<0.6, 0.2<d<1.7, and a+b+c=3+d.

Nevertheless the basicities of above-mentioned aluminium polychlorides are lower than 57% and not high enough for some applications, as in water treatment.

b) The Japanese Patent No. JP 52113384 describes a process for the preparation of aluminium polychlorosulphate having high basicity in which an alkaline reagent, such as $CaCO_3$, $NaHCO_3$, $Na_2CO_3$, $Mg(OH)_2$ or MgO, is added at a temperature lower than 60° C. to a solution of an aluminium compound previously prepared by reacting a low basicity aluminium polychlorosulphate with $CaCO_3$, thus obtaining gypsum as by-product, which is then separated. The major drawbacks of this process are the following: the basicity of this intermediate aluminium compound is 50%, the residual aluminium levels are too high and a considerable production as by-product of gypsum, which is of difficult disposal, occurs.

c) The Japanese Patent No. JP 53001699 describes a process for the preparation of high basicity aluminium polychlorosulphate, where first a medium basicity aluminium polychlorosulphate is reacted with $CaCO_3$ in equimolecular amount with respect to sulphate, thus obtaining gypsum, which is then separated. In the next step, the so obtained product with a basicity ranging between 55% and 58%, is reacted with a compound chosen among $CaCO_3$, $NaHCO_3$, $Na_2CO_3$, $Mg(OH)_2$ and MgO.

Nevertheless, even if these processes lead to high basicity compounds (basicity lower than 70%), they present the major drawback of a large acidic gypsum coproduction, of difficult disposal.

d) The European Patent No. EP-327419 describes a process for the preparation of aluminium polychlorosulphate having the general formula

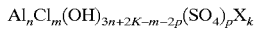

where

X represents an alkaline-earth metal, preferably calcium, n, m, p, q represent the molar concentrations (mole/litre) of the ions in solution, [(3n+2K−m−2p)/3n]·100 represents the basicity.

The basicity of the products described in EP-327419 ranges between 45% and 70%, thus being high enough, and the products satisfy the above described requirements for water treatment; nevertheless, they present the major drawback of generating acidic gypsum as a by-product, whose disposal represents an ecological problem difficult to solve. Furthermore, the production process is complicated, including a filtration step, the washing of the filter cake and the recovery of active principle. A cooking phase at high temperature is also necessary. The investment and manufacturing costs are therefore elevated.

e) The European Patent No. EP-0557153 describes a process for the preparation of aluminium polychlorosulphates with a high basicity ranging between 65% and 75%, and low effluent production. Nevertheless a big disadvantage of this process is its scarce reproducibility. This lack of reproducibility is shown by the presence of high levels of residual aluminium in treated water in 80% of cases.

f) The European Patent No. EP-0794153 describes aluminium polychlorosulphates having the general formula:

$$Al(OH)_a Cl_b Y_{c/d} M'Cl_{2/e} M''Cl$$

where

Y represents an anion with valency 2, such as $SO_4^{2-}$,

M' represents a cation with valency 2, such as an alkaline-earth metal,

M'' represents a cation with valency 1, such as an alkali metal or ammonium, a, b, c, d are non-zero positive integers or non-zero positive fractions, e can be zero or a positive integer or a positive fraction, where:

1.8<a<2.25
0.001<c<0.15
b=3−2c−a
2d+e+b≦3.

The process described in EP-0794153 reduces but does not eliminate the co-production of gypsum illustrated in the above mentioned patent EP-327419. The process is complicated because it includes a filtering operation and a cooking step at high temperature.

On the other hand, according to the above-mentioned process, the use of an alkaline-earth metal compound in the basification step is necessary, which can cause the precipitation of alkaline-earth metals sulphates, typically of calcium, scarcely soluble in an aqueous salt solution.

SUMMARY OF THE INVENTION

Now the Applicant has found an advantageous process for the preparation of new aluminium polychlorosulphates having high basicity and stability, a low sulphate content, and a high flocculating and coagulating power, corresponding to the following general formula (I)

$$Al(OH)_l Cl_m (SO_4)_n M_p \quad (I)$$

where

M represents an alkali metal, l, m, n, p represent the number of moles per mole of aluminium, so that 1.74≦l≦2.25,
0.01≦n≦0.17,
0.32≦p≦1.49, and
l+m+2n=p+3.

These compounds may be obtained by a process comprising the following steps, carried out at room temperature:

(a) reaction with a basic compound of an alkali metal, of a aluminium polychloride or polychlorosulphate having the general formula (I')

$$Al(OH)_{l'} Cl_{m'} (SO4)_n M_{p'} \quad (I')$$

where
1.1≦l'≦1.44,
0≦n'≦0.10,
p'≦p (p of formula (I)),
l'+m'+2n'=p'+3;

(b) reaction of the product obtained from step (a) with a compound that provides sulphate ions.

The subjects of the present invention are therefore the above aluminium polychlorosulphates of formula (I) and the preparation process thereof. The present compounds of general formula (I) have proved effective as coagulation and flocculation agents; the use of the present compounds as coagulation and/or flocculation agents for example in water treatment processes, in the paper industry, in the industrial clarification processes, in the preparation of catalyst supports and of antiperspirant compounds, constitutes a further subject of the present invention.

DETAILED DESCRIPTION OF THE INVENTION

The present process allows to prepare new aluminium polychlorosulphates of high basicity, low sulphate content, high coagulating and flocculating power and good stability, without the co-production of gypsum and of any type of effluent, and with low level of residual aluminium in treated water.

The present process is easy to perform because no heating, cooling nor filtering of the process streams is required. The co-production of gypsum or of any other effluent is completely eliminated.

The basicity of the present formula (I) compounds may range from 58 to 75%, preferably from 58 to 66%, where the basicity is defined by the formula $$B\% = (l/3) \cdot 100.$$

The present process for obtaining the compounds of formula (I) comprises the reaction at room temperature of an aluminium polychloride or polychlorosulphate, having the general formula(I')

$$Al(OH)_{l'} Cl_{m'} \cdot (SO4)_{n'} \cdot M_{p'}. \quad (I')$$

where
1.1≦l'≦1.44,
0≦n'≦0.10,
p'≦p (p of formula (I)),
l'+m'+2n'=p'+3, with a basic compound of an alkali metal, until the reaction is completed.

Subsequently sulphate in form of an alkali metal sulphate or sulphuric acid is added.

This is followed by a conditioning step of 1 to 5 hours, preferably 1 to 3 hours, at room temperature.

The aluminium polychlorides and polychlorosulfates which can be used according to the invention are well known and obtainable by reacting hydrated alumina with hydrochloric acid or a mixture of hydrochloric and sulphuric acid at high temperature. Such products are generally available as aqueous solutions or to a lesser extent as solid products under various tradenames such as Prodefloc® (polyaluminum chloride; Al₂O₃ 16–18%; basicity 38–42%) from the firm Prodeco or Wac® (basic aluminum polychlorosulphate aqueous solution; Al₂O₃≧10%; basicity ≧38.5%) from the firm Elf Atochem or Panfloc® (polyaluminum chloride; Al₂O₃ 16–18%; basicity 38–42%) from the firm Panamericana.

The basic compounds of an alkali metal that can be used in the reaction with the compound of formula (I) are, for example, $Na_2CO_3$, $NaHCO_3$, NaOH, $K_2CO_3$, $KHCO_3$ and KOH. Preferably $Na_2CO_3$ or NaOH are used. Such compounds can be used as such, or optionally may be used in mixture with basic alkaline-earth metal compounds, depending on the solubility of the alkaline earth metal sulphates in the reaction medium.

Alkaline-earth metal basic compounds of possible use according to the present invention are, for example, CaO, $Ca(OH)_2$, $CaCO_3$, MgO, $Mg(OH)_2$, $MgCO_3$, $CaHCO_3$, $MgHCO_3$.

The sulphate ions can be provided by $Na_2SO_4$, $NaHSO_4$, $Na_2SO_4 \cdot 10\ H_2O$, $K_2SO_4$, $KHSO_4$ and $H_2SO_4$, preferably $Na_2SO_4$ or $H_2SO_4$ are used.

The basic compounds of alkali metals and, in case, alkaline-earth metals, and the compounds containing sulphates can be used in the form of solid salts or aqueous solutions.

As shown in the general formula above, the aluminium polychlorides or polychlorosulphates used as starting material may contain or not cations M, which can originate from the raw materials used to prepare the above-mentioned aluminium compounds or from a partial neutralisation of the above-mentioned aluminium compounds with a basic compound containing a cation M; the starting material can also be a aluminium polychlorosulphate instead of an aluminium polychloride, with a sulphate level n'<0.10. This way, in a second step, the corresponding amount of sulphate up to a level of n=0.17 may be complemented, according to the invention.

According to the present invention the introduction order of the reactants into the reaction medium is so that first the basification with a basic compound of an alkali metal is accomplished. Once completed the basification reaction, the compound containing sulphate is added.

A conditioning step under gentle stirring at room temperature follows, preferably with a duration ranging between 1 and 3 hours.

The following examples are given to provide a non-limiting illustration of the present invention.

EXAMPLE 1

100 g of aluminium polychloride with a basicity of 37% and an $Al_2O_3$ content of 18.50% were reacted under moderate stirring at room temperature lower than 40° C., with a sodium carbonate solution obtained by dissolving 8.13 g of sodium carbonate in 25.4 g of water. The addition speed of sodium carbonate was compatible with the release of gaseous $CO_2$. After approximately 30 minutes to 1 hour the sodium carbonate addition was terminated. Stirring continued for another 30 minutes until complete solution of the sodium carbonate.

Subsequently 4.5 g of solid anhydrous sodium sulphate were added in small portions. After about 10 minutes the sodium sulphate addition was completed. Under continuous stirring the reaction was completed after 3 more hours. The clear solution obtained presented the following weight composition determined by analysis:

$Al_2O_3$ 12.1%; Cl 16.0%; $SO_4$ 2.96%; basicity 58%, corresponding to the following empirical formula $Al(OH)_{1.74}Cl_{1.90}(SO_4)_{0.13}Na_{0.90}$

EXAMPLE 2

100 g of aluminum polychloride with $Al_2O_3$ 17.4% and basicity 48% were reacted under moderate stirring at room temper lower than 40° C., with a sodium carbonate solution obtained by dissolving 5.1 g of sodium carbonate in 29 g of water. The addition speed of sodium carbonate was compatible with the release of gaseous $CO_2$. After approximately 30 minutes the sodium carbonate addition was completed. Stirring continued for another 30 minutes until complete solution of the sodium carbonate. Subsequently 2.13 g of anhydrous sodium sulfate were added in small portions. After about 30 minutes the sodium sulfate addition was ended. Under moderate stirring the reaction was completed after 3 more hours. The clear solution obtained presented for analysis the following weight composition:

$Al_2O_3$ 11.5%; Cl 12.5%; $SO_4$ 1.4%; basicity 62%, Corresponding to the following empirical formula $Al(OH)_{1.86}Cl_{1.56}(SO_4)_{0.065}Na_{0.90}$

EXAMPLE 3

100 g of aluminium polychloride with $Al_2O_3$ 18.5% and basicity 48% were reacted under stirring at 30° C. with 9.3 g of sodium carbonate dissolved in 35 g of water kept at 30° C. Subsequently 0.31 g of anhydrous sodium sulphate were added in about 10 minutes, and stirring was continued for another 3 hours. The clear solution obtained presented by analysis the following weight composition:

$Al_2O_3$ 10.9%; Cl 11.83%; $SO_4$ 0.21%; basicity 75%, corresponding to the following empirical formula $Al(OH)_{2.25}Cl1.56(SO_4)_{0.01}\ Na_{0.83}$

EXAMPLE 4

100 g of aluminium polychloride with $Al_2O_3$ 17.2% and basicity 43% were reacted under stirring at 28° C. with 7.0 g of sodium carbonate dissolved in 33.8 g of water kept at 28° C. Subsequently 4.8 g of anhydrous sodium sulphate were added in about 30 minutes, and stirring was continued for another 3 hours. The clear solution obtained presented by analysis the following weight composition:

$Al_2O_3$ 10.6%; Cl 14.0%; $SO_4$ 3.2%; basicity 64%, corresponding to the following empirical formula $Al(OH)_{1.92}Cl_{1.90}(SO_4)_{0.16}\ Na_{1.14}$

EXAMPLE 5

The following example illustrates the "jar tests" results on water from the Guandu river, with turbidity of 9NT and pH 8.0, hardness 14 ppm $CaCO_3$ and alcalinity 16 ppm $CaCO_3$. Turbidity and residual aluminium in the decanted water were determined after 10 minutes of decantation.

The results in comparison to commercial aluminium sulphate (S.A.) and to commercial polyaluminium chloride (PAC) are reported below.

Turbidity and residual aluminium results are expressed in % of the values obtained using commercial aluminium sulphate.

Relative turbidity=[NTU(PCSA)/NTU (S.A.)]·100

Relative residual Al=[ppb Al (PCSA)/ppb Al (S.A.)]·100 where NTU (PCSA)=average turbidity in NTU using as coagulating agent the aluminium polychlorosulphate of the invention NTU (S.A.)=average turbidity in NTU using as coagulating agent commercial aluminium sulphate.

ppb Al (PCSA)=ppb of aluminium in the decanted water using as the coagulating agent the aluminium polychlorosulphate of the invention ppb Al (S.A.)=ppb of aluminium in the decanted water using as the coagulating agent commercial aluminium sulphate.

TABLE

|  | Relative turbidity | Relative residual Al | Stability at 45° C. |
|---|---|---|---|
| Example 1 | 56 | 87 | >1 month |
| Example 2 | 41 | 77 | >1 month |
| Example 3 | 62 | 61 | >1 month |
| Example 4 | 46 | 89 | >1 month |
| PAC | 97 | 95 | >1 month |
| S.A. | 100 | 100 | >1 month |

The table above indicates that all aluminium polychlorosulphates of the invention exhibit a much higher coagulating/flocculating power than that of aluminium sulphate (S.A.), determined by measuring the decanted water turbidity after 10 minutes of decantation. It shows also that a sufficiently high sulphate level and a medium basicity favour low turbidity (Example 2 and Example 4). High basicity values and low sulphate levels favour low levels of residual aluminium (Example 3). Comparatively high sulphate levels associated with a relatively low basicity favour a good coagulation, nevertheless associated with relatively high levels of residual aluminium (Example 1).

What is claimed is:

1. Aluminum polychlorosulphates having the general formula (I)

$$Al(OH)_l Cl_m (SO_4)_n M_p \qquad (I)$$

where

M represents an alkali metal, l, m, n, p represent the number of moles per mole of aluminum, so that:

$1.74 \leq l \leq 2.25$,
$0.065 \leq n \leq 0.17$,
$0.32 \leq p \leq 1.49$, and
$l+m+2n=p+3$, and whose basicity, defined as $(l/3) \times 100$, ranges between 58% and 75%.

2. The aluminum polychlorosulphates according to claim 1, whose basicity defined as $(l/3) \times 100$ ranges between 58% and 66%.

3. A process for the production of the aluminum polychlorosulphates having the general formula (I)

$$Al(OH)_l Cl_m (SO_4)_n M_p \qquad (I)$$

where

M represents an alkali metal, l, m, n, p represent the number of moles per mole of aluminum, so that:

$1.74 \leq l \leq 2.25$,
$0.065 \leq n \leq 0.17$,
$0.32 \leq p \leq 1.49$, and
$l+m+2n=p+3$, and whose basicity, defined as $(l/3) \times 100$, ranges between 58% and 75%, comprising the following steps, carried out at room temperature:

(a) reaction of a basic compound of an alkali metal with aluminum polychloride or polychlorosulphate having the general formula (I')

$$Al(OH)_{l'} Cl_{m'} (SO_4)_{n'} M_{p'} \qquad (I')$$

where $1.1 \leq l' \leq 1.44$,
$0 \leq n' \leq 0.10$,
$p' \leq p$ (p of formula (I)),
$l'+m'+2n'=p'+3$;

(b) reaction of the product obtained from step (a) with an alkali metal sulphate.

4. The process according to claim 3, wherein the said basic compound of an alkali metal in step (a) is selected from the group consisting of $Na_2CO_3$, NaOH, $NaHCO_3$, $K_2CO_3$, $KHCO_3$ and KOH.

5. The process according to claim 3, wherein the said basic compound of an alkali metal is added in solid state or as aqueous solution.

6. The process according to claim 3, wherein the said alkali metal sulphate in step (b) is selected from the group consisting of $Na_2SO_4$, $NaHSO_4$, $Na_2SO_4 \cdot 10\ H_2O$, $K_2SO_4$ and $KHSO_4$.

7. The process according to claim 3, wherein the said alkali metal sulphate is added in step (b) in solid state or as aqueous solution.

8. The process according to claim 3, wherein the mixture resulting at the end of steps (a) and (b) is kept under stirring at room temperature.

9. The process according to claim 3, wherein the mixture resulting at the end of step (b) is kept under stirring at room temperature for 1 to 5 hours.

* * * * *